Dec. 13, 1932.  L. H. ECHOLS  1,890,725
EYEGLASS LENS FASTENING
Filed Oct. 3, 1931
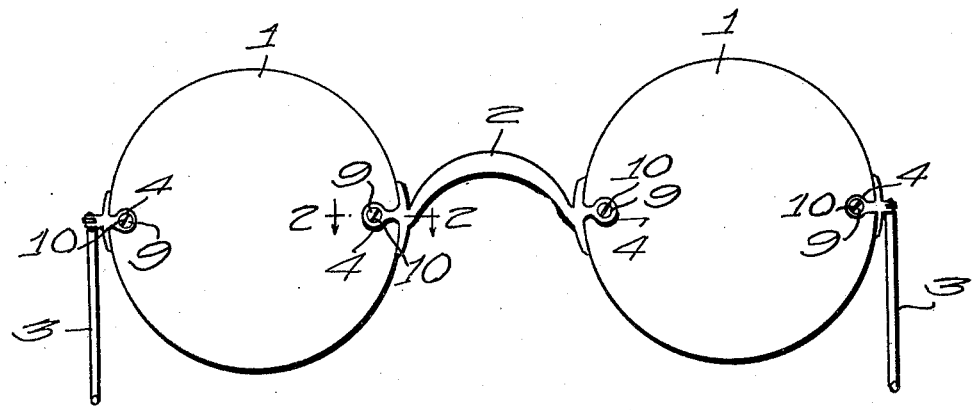
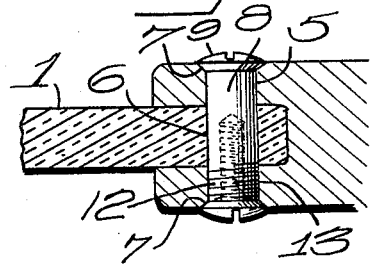
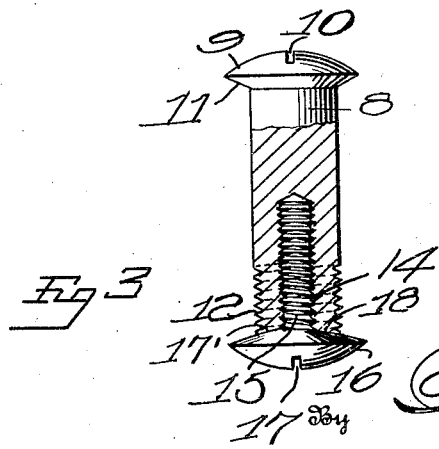
Inventor
L. H. ECHOLS.
Attorney Patented Dec. 13, 1932

1,890,725

UNITED STATES PATENT OFFICE

LUTHER H. ECHOLS, OF LEXINGTON, KENTUCKY

EYEGLASS LENS FASTENING

Application filed October 3, 1931. Serial No. 566,729.

My invention relates to improvements in eyeglass lens fastening, used in securing the nose piece and temple bar connections to the lenses of the eyeglass.

The present means for fastening the nose piece and temple bars to the lenses is very defective and objectionable for the reason that the constant use of the eyeglass and the tension and strain upon the lens fastening, causes the lenses to work loose and require either new fastenings or the tightening or fixing of the fastening which requires the loss of time and the consequent expense.

With this defect and objection in view the main object of my invention is the provision of a fastening which will secure the fastenings of the nose piece and temple bars upon the lenses in a rigid manner upon eyeglasses in general use, or at the time the eyeglasses are sold, and which will absolutely remain in perfect locked condition under all circumstances.

Another object of my invention is the provision of a lens fastening which will cost practically the same as the fastenings in use but which will withstand the strain and usage and will remain in perfect locked condition.

Another object of my invention is the provision of a lens fastening which will have an attractive and ornamental appearance, which will be of the same size as the fastenings in general use, and which will be thoroughly efficient and practical from every point of view.

To attain the desired objects my invention consists of an eyeglass lens fastening embodying novel features of construction and combination of parts, substantially as described and claimed and as shown in the drawing, in which:

Figure 1 represents a front elevation of a complete eyeglass provided with my improved lens fastening.

Figure 2 represents a view on an enlarged scale taken on line 2—2 of Figure 1, and Figure 3 represents a view in section and elevation of the main portion of my fastening.

In carrying my invention into effect it has been a most important aim to produce a fastening which will perfectly secure the lenses and at the same time add practically nothing above the cost of the present fastenings, and in Figure 1, is shown a complete eyeglass composed of the lenses 1, the nose piece 2, and the temple bars 3, the temple bars and nose piece being each provided with the similarly constructed pairs of ears 4, which embrace the edges of the lenses and are secured thereto as clearly shown.

In Figure 2 is shown on an enlarged scale the ears 4, in which fits the edges of the lenses 1, and said ears are formed with an opening or passage 5, which registers with the opening or passage 6, in the lenses and the ears around the outer edges of said openings are formed with a countersunk portion 7.

Passing through the registering or aligned openings of the lenses and ears are the fastening screws 8, having a head 9, formed with slit 10, to receive a screw driver or like implement and below the head being formed with the flared portion 11, to fit and seat snugly in the counter sunk portion 7, and having its other end formed with the exterior threads 12, to engage the threads 13, of the ears, while said exteriorly threaded end is also provided with a threaded socket 14, whose threads are disposed in a reverse or opposite direction from the exterior threads.

It will thus be seen that the fastening screw passes through the ears and lens and engages the threads of the ears and thus anchors the parts in assembled relation and to lock the fastening screws in place I provide the screw 15, whose threads engage the threaded socket 14, and this locking screw is provided with the head 16, having the slit 17, to receive a screw driver and also the underside of the head 17′, is flared and fits the depressed or countersunk portion 18 of the screw fastening 8, making a tight fit and acting with the locking screw to hold the main screw from movement under any condition.

It will be apparent to any person skilled in lens fastenings that this improvement possesses many advantages to insure a practical and desirable device.

I claim:

In an eyeglass lens fastening, the combination with the lens and ears embracing the edges of said lens and each formed with an aligning opening, a fastening screw mounted in the said aligning openings with a head at one end and exterior threads at its other end, a threaded socket in the said exteriorly threaded end of said screw, and a locking screw fitting said threaded socket and formed with a head, the head of said locking screw having its underface tapered and the end of the fastening screw being tapered to co-act therewith, said threads of the locking screw and the exterior threads on the fastening screw being in reverse direction to form a locking connection between the fastening and locking screw.

In testimony whereof, I affix my signature.

LUTHER H. ECHOLS.